United States Patent [19]

Kamin

[11] Patent Number: 5,027,213
[45] Date of Patent: Jun. 25, 1991

[54] VIDEO SIGNAL MIXER SYSTEM

[75] Inventor: Gerhard Kamin, Mühltal, Fed. Rep. of Germany

[73] Assignee: Robert Bosch GmbH, Stuttgart, Fed. Rep. of Germany

[21] Appl. No.: 453,400

[22] Filed: Dec. 19, 1989

[30] Foreign Application Priority Data

Dec. 21, 1988 [DE] Fed. Rep. of Germany ....... 3842977

[51] Int. Cl.$^5$ ..................... H04N 5/262; H04N 5/265; H04N 5/45
[52] U.S. Cl. ..................................... 358/183; 358/22; 358/182
[58] Field of Search ......................... 358/183, 22, 182; 340/182

[56] References Cited

U.S. PATENT DOCUMENTS 4,668,989  5/1987  Mackereth ......................... 358/182

FOREIGN PATENT DOCUMENTS 0236943   9/1987  European Pat. Off. .
3612934  10/1987  European Pat. Off. .
3620155A1 12/1987 Fed. Rep. of Germany .

Primary Examiner—James J. Groody
Assistant Examiner—Glenton B. Burgess
Attorney, Agent, or Firm—Frishauf, Holtz, Goodman & Woodward

[57] ABSTRACT

In a video mixer each input video signal is modified by only a single multiplier before its contribution is added to the contributions of other input video signals to produce the output video signal. The sums of the contributions of the video signals which participate at any time in the output signal corresponds to a predetermined value for the overall amplitude range. The mixing factor signals supplied to each of the mixers which are in line with the inputs are generated by two priority cascades of subtracters, multipliers and adders, each of which provides for the composition of an output picture, up to six video input signals and a switching system permits allocating priorities between the inputs in any desired way on a permanent or variable basis. The two separate cascades of control signals are connectable through the in line multipliers in such a way that a composite output picture made up of up to 6 input video signals can be faded over to another composite input signal likewise made up of up to 6 or more input video signals, not all of which need to be different on both sides of the fade. One cascade can be used to prepare the next composite picture and additional switching make possible the preview of the next composite picture on a preview monitor before that next picture is faded in.

12 Claims, 4 Drawing Sheets a)

b)

c)

VIDEO SIGNAL MIXER SYSTEM

This invention concerns a video mixer system having a multiplicity of video signal inputs respectively connected to a multiplicity of primary multipliers, which in turn have outputs respectively connected to inputs of an addition circuit, which has a sum output for making available an output video signal.

Mixer systems for video signals serve to derive an output video signal from two or more input video signals. The input video signals represent different pictures, while the output video signal incorporates an output picture just to be transmitted or to be recorded. By means of video mixers the following operations can be carried out:

In the first place, fading from one input picture to another can be done, with either amplitude fading or else a so-called special effect transition in which one picture progressively spreads in arbitrary patterns over the screen until the previous picture disappears. In case of amplitude fading the amplitudes of the input video signals which are respectively to be faded in and out are oppositely modified, while the amplitude range of the overall picture remains the same or is modified in the same sense for both of the participating pictures. In special effect fading, horizontally and vertically synchronous control signals are generated which, during progressive fading, cause the area portion of a first input picture to be reduced in area while the area of a second input picture is correspondingly increased. In the second place, two or more input pictures can be put together to provide a composite output picture, as for example the combination of a background picture and a foreground by use of the blue wall method, or the insertion of a legend or of a small picture, or the showing of two pictures side by side, and so on. In such composite output pictures, parts of one input picture conceal the corresponding parts of another input picture. Thus for example in the case of insertion of a picture signature in the output picture those picture elements (pixels) which form the written characters are displayed independently of the local corresponding pixels of the picture in which the characters are inserted. For these portions of the picture the input video signal that represents the written characters has the benefit of a priority higher than the priority of the other input video signal and therefore appears to lie in a plane closer to the observer than the picture in which these characters are inserted.

Finally, in addition to a fading over between individual input pictures, a fading over can be accomplished between an individual input picture and an already composed composite picture or between two composite pictures.

In the known video mixer systems, for example the system disclosed in published German Patent Application (OS) 36 20 155, every one of the input video signals producing the output picture is multiplied by a single control signal. Thereafter all the modified input video signals are added together. The control signals in this system consist of one or more control signal components. For distinguishing them from other control signals the control signals provided for multiplication with video signals are hereinafter referred to as mixing factor control signals Thus, it is avoided in the known mixers and mixing systems to allow the input video signals pass through two or more multiplier circuits in succession, since each multiplication results in some impairment of the signal quality. In the known mixers, however, it is sometimes necessary for a single input video signal to be simultaneously supplied to two or more mixing multipliers when that input video signal is needed in more than one priority plane. Since these mixing multipliers are not exactly alike, disturbing offset jumps in signal level in the output video signal occur within picture components which have originated from the same input picture that have respectively come to occupy different priority planes in the output picture.

SUMMARY OF THE INVENTION

It is an object of the present invention to provide a mixer system for mixing video signals in which the above-described disadvantages are avoided or overcome.

Briefly, each video signal input is connected to only one of the primary multipliers which are "in line" between a video signal input and the addition circuit which produces the output video signal. Means are provided for supplying mixing factor signals to the respective primary multipliers for determining the relative contributions, if any, of the input video signals to the output video signal. Means are also provided to assure that the sum of all the mixing factor signals relating to inputs at which video signals simultaneously contributing to the output video signal are present corresponds to a predetermined value for the amplitude range of the output video signal.

The video mixer system of the invention has the advantage that the pixels which make up the output picture and which belong to a particular input picture reach the mixer system output by only one path, independent of the particular priority plane in which they appear in both composite and transition output pictures. Any unintended visible modification in the output picture where there is a change of the priority of pixels of an input video signal is therefore inherently excluded. It is particularly advantageous to provide digital generation of the mixing factor signals because that makes exact reproducibility possible. If the input video signals provided to the primary multipliers are analog signals, the primary multipliers, too, must be of the analog type. This, however, requires convertion of the digitally generated mixing factor signals to analog form for supply to the respective primary multipliers.

To generate mixing factor signals, a set of output control signals is supplied to a cascade of subtracters and multipliers to produce a set of priority signals with the help of a first crossbar switch and a set of, if at all, at least two-input addition circuits. The number of the addition circuit inputs is equal to the number of different priority planes occupied by an individual input video signal in the composite output video picture. The outputs of the addition circuits can then be switched by second crossbar switches to the fading circuits of the individual primary multipliers. Preferably two priority cascades and related first and second crossbar switches are provided, so that the fading circuit of the individual primary multipliers may be able to produce fading from one composite picture to another, while an additional crossbar switch makes it possible to have a monitor preview of the composite picture to be faded in. The fading circuits each include an addition circuit, the output of which goes to the control input of a primary multiplier as the mixing factor signal, and pair of fading multipliers, the respective outputs of which go to the respective inputs of the addition circuit. One of the fading multipliers receives the appropriate priority signal of the composite picture to be faded out and also a fading signal in and the other fading multiplier receives the appropriate priority signal of the picture to be faded in for the same video input and the unity complement n of the fading signal, generated from the fading signal by a complement circuit, so that the fading signal in can be supplied to the fading circuits of all multipliers simultaneously.

BRIEF DESCRIPTION OF THE DRAWINGS

Further details of the invention are best understood by description of an illustrative example, with reference to the annexed drawings in which.

The same parts are designated in the same way in the several figures.

Figure 1:
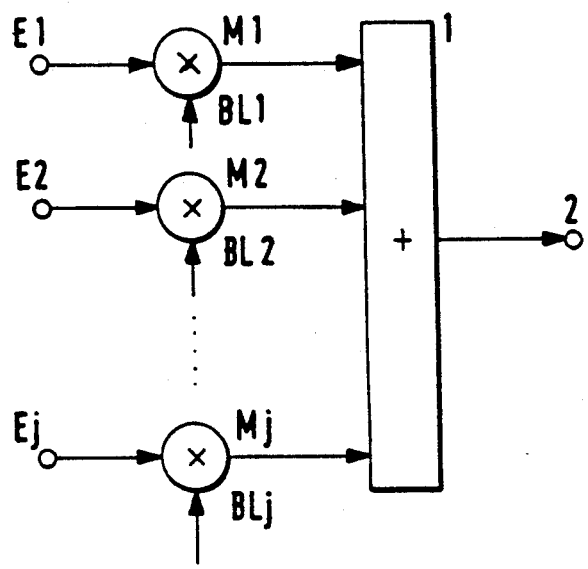
FIG. 1 is a drastically skeletonized basic diagram of a video mixer according to the invention.

DESCRIPTION OF THE ILLUSTRATED EMBODIMENT:

The video mixer shown in skeleton form in FIG. 1 has j inputs E1, E2, ... Ej for video signals, respectively connected through multipliers M1, M2, ... Mj to inputs of an addition circuit 1. The input video signals are here designated E1, E2, ... Ej, in the same way as the corresponding inputs are designated.

A video mixer of the invention can be provided according to the requirements of the particular case for analog or digital video signals. Indeed, component signals or coded signals can be processed. In the case of component signals a corresponding number of parallel multipliers are to be provided. The output video signal is made available at an output 2.

The number of video signal inputs, here represented by j, is made large enough to permit the provision of an individual input for each signal for the case of the largest number of video signals that may be simultaneously needed of the composition of an output picture or for the putting together of several pictures in a transitional fading procedure.

Fading factor signals BL1, BL2,... BLj are respectively provided to the multipliers M1, M2,... Mj for determining how large a proportion of the input video signal each output video signal is. The fading factor signals can be varied as needed, and likewise the corresponding contributions of the input video signals as may be needed from any picture element (pixel) to the next.

In the known video mixers a crossbar switch is in general connected ahead of the video signal inputs so that individual video signals may if desired be connected simultaneously to several inputs if it should be necessary for this video signal to appear in two or more priority planes. In such cases, however, video input signals of a single source were passed over paths of different parameters, thus leading to the disturbances mentioned in the introduction to this specification.

Figure 2B:
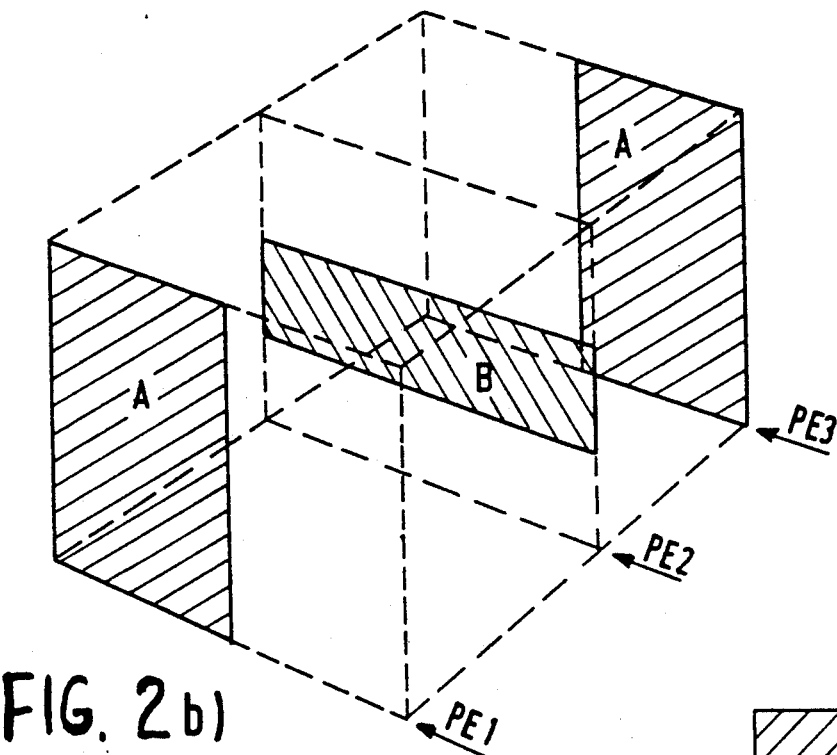
FIG. 2a) is a diagram of a composite picture and FIG. 2 b) is a schematic perspective representation of the concept of priority planes of video signals mixed to produce the picture of FIG. 2a)
Figure 2A:
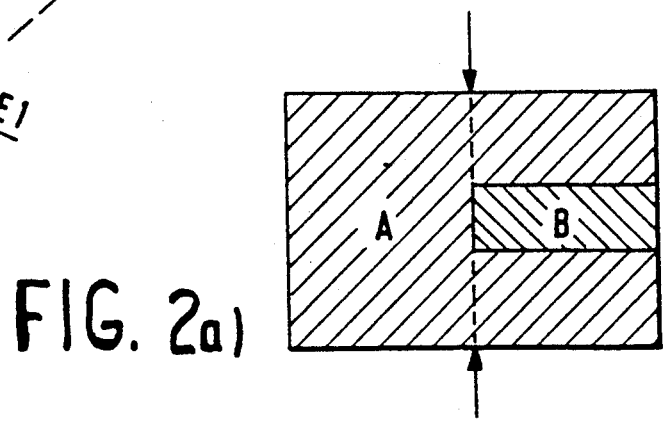

In the mixer of this invention, the provision of a preliminary crossbar switch is of course not precluded, but it is not necessary to supply an input video signal to more than one mixer input when an interchange of priority planes is provided within the same picture FIGS. 2a) and 2b) show an example in which parts of a single input picture appear in an output picture in different priority planes. FIG. 2a) shows the output picture as it appears to a viewer, whereas FIG. 2b) illustrates the relation of the individual input video signals or parts thereof to the respective priority planes, as will now be explained.

The picture shown in FIG. 2a) is composed of a first input picture A and a second input picture B, wherein only the shaded region of B is allowed to pass through a mask. Furthermore, only the right-hand half of the picture B is to be displayed in front of the input picture A. Accordingly the left half of the picture A is taken from the priority plane PE1, the picture B is taken from the priority plane PE2 and the right half of the picture A is taken from the priority plane PE3. In order to compose the output picture by the method heretofore known, three input channels are needed, of which two are occupied by the video signal A. As a result, with the priority jump in the picture A there is also, generally, a step or jump in the luminance or color.

In contrast thereto, in the mixer of this invention only two input channels are needed for the same composite picture. In the channel supplying the signal A that signal is modified multiplicatively by a fading factor signal combination which takes account of the different priority planes. The fading factor signals BL1, BL2,... BLj are so constructed that in those regions of the output picture in which the picture A appears, exactly the same transmission conditions reign independently of the different priority planes.

Figure 3:
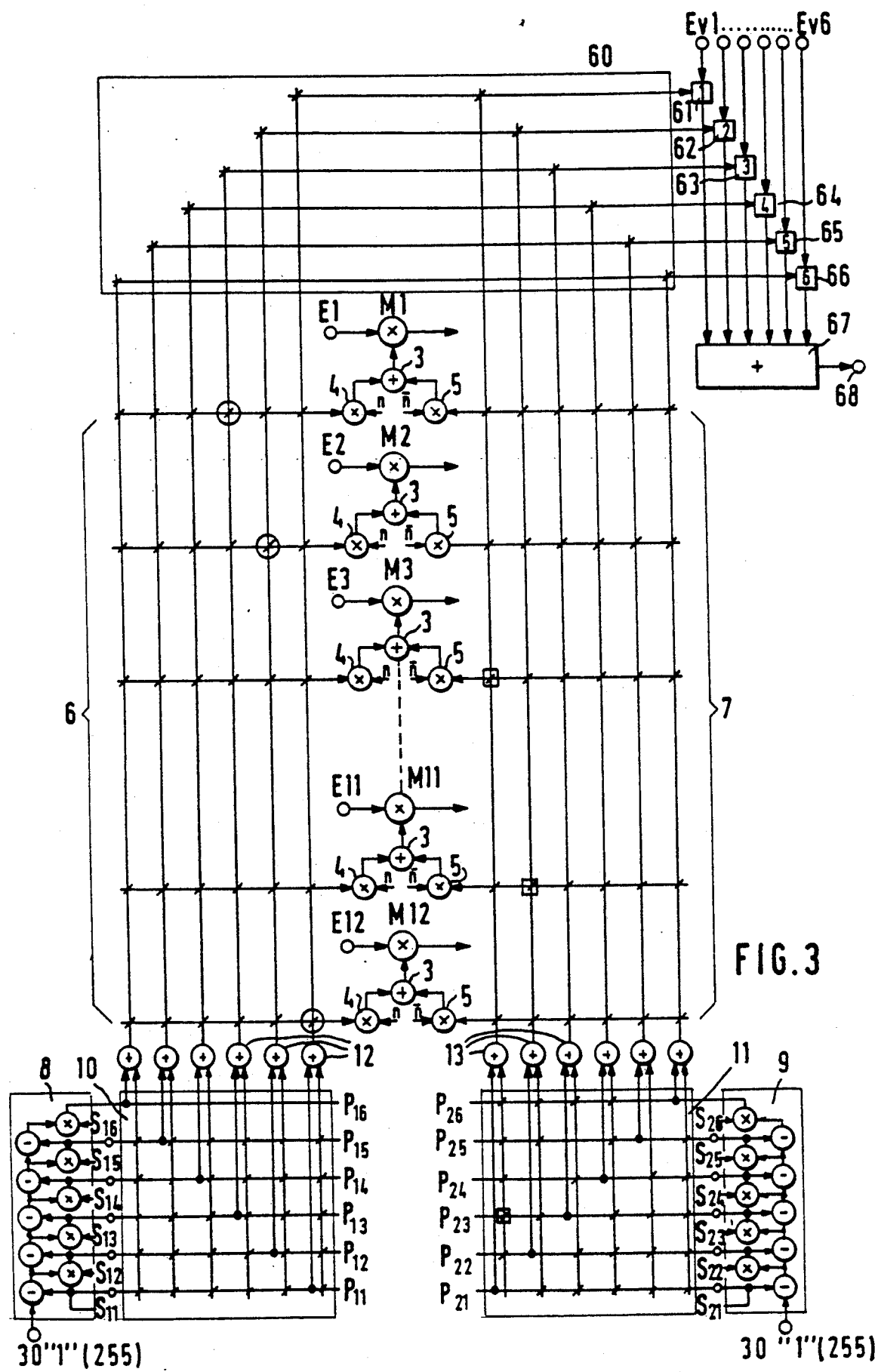
FIG. 3 is a circuit block diagram of an illustrative embodiment of a video mixer according to the invention.

In the illustrative embodiment shown in FIG. 3 twelve multipliers M1, M2,... M12 are provided, of which the outputs are connected respectively to inputs of the adding circuit 1 (not shown in FIG. 3). At the corresponding video inputs E1, E2,... E12 different input video signals can be connected. The fading factor signals are obtained, by means of the respective adding circuits 3, from two priority signals in each case which, in turn, are the respective outputs of two multipliers 4 and 5.

Figure 5:
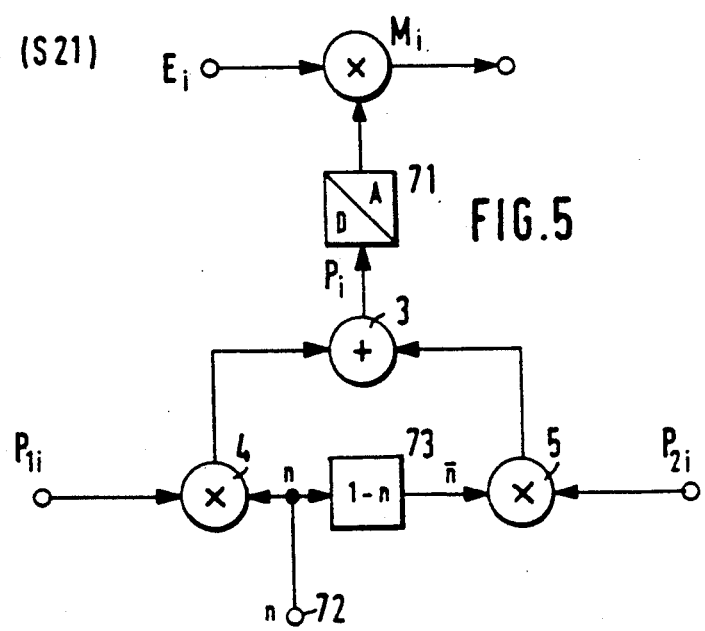
FIG. 5 is a more detailed circuit bock diagram of another portion of the embodiment shown in FIG. 3.

The several multipliers are each supplied with a fade signal n or n̄ and a priority signal P1i or P2i (FIG. 5). In this context n̄ means the complement of n relative to "1" or 100%. n and n̄ may have values from 0 to 1 only. The priority signals P1i and P2i are respectively supplied to the multipliers 4 and 5 from the respective crossbar switches 6 and 7. In that way the priority signals can be provided as might be best to the multipliers M1 to M12 and for the input signals E1 to E12. In other words the connections of video signal sources to the respective inputs E1 to E12 does not need to take any priority sequence into account.

The priority signals P1i and P2i are respectively derived from priority cascades 8 and 9, additional crossbar switches 10 and 11 and addition circuits 12 and 13. The priority cascades are each composed, for example, of five subtracters and five multipliers whereby six priority signals, P11 to P16 in one case and P21 to P26 in the other case, are generated.

Figure 4:
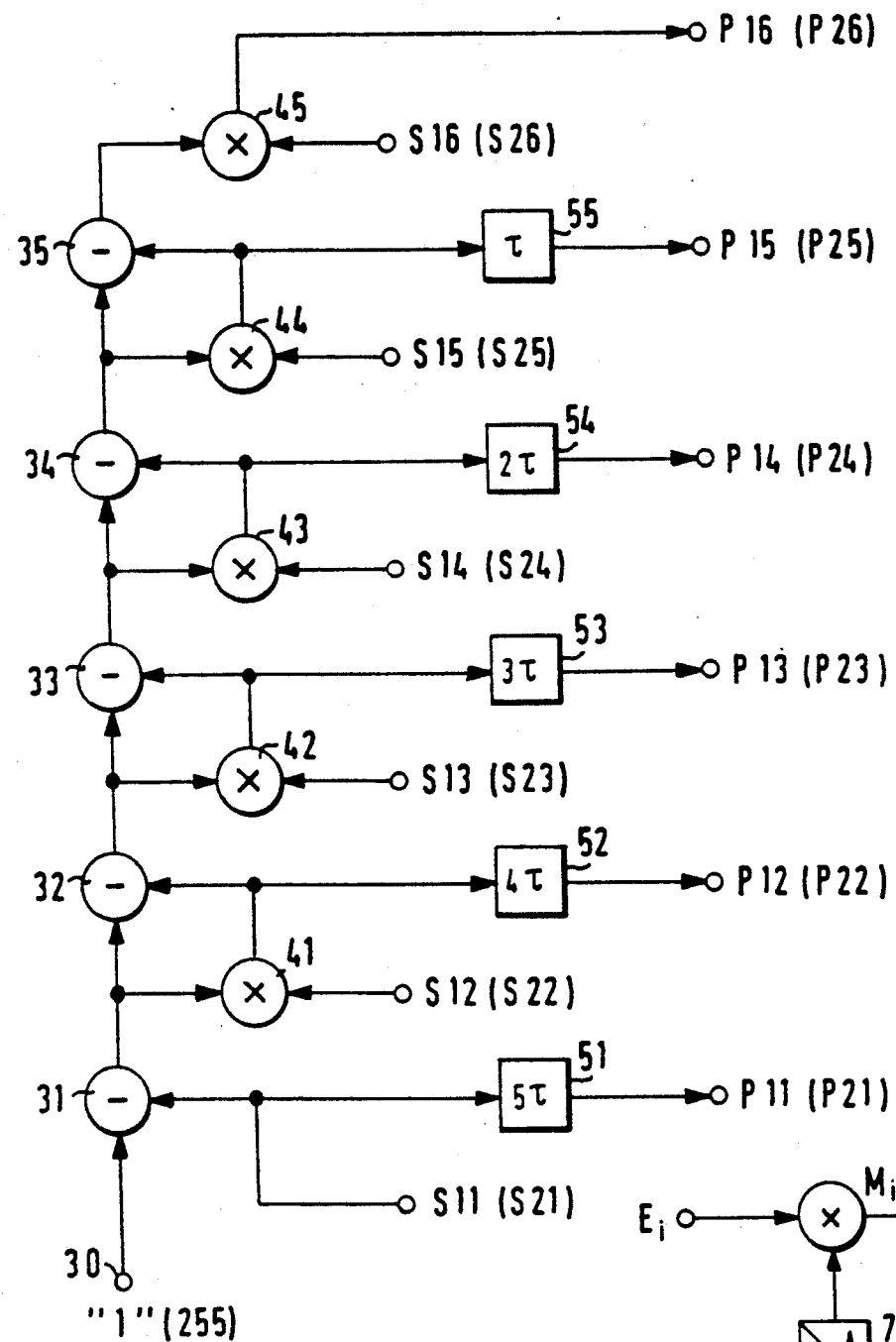
FIG. 4 is a more detailed circuit block diagram of a portion of the embodiment shown in FIG. 3.

A value representing 100%, which in the case of an 8-bit system is 255, is supplied to the first subtracter 31 (FIG. 4). A first control signal S11 having the value of the first priority is supplied to another input of the first subtracter 31, and is likewise used (after a delay) as the first priority signal P11. The first control signal S11, as well as the other control signals S12 to S16, respectively designate in what magnitude an input video signal corresponding to the control signal can claim an amplitude range which is not already used up by higher priorities. These control signals S can hold a constant value over the entire picture or they can represent masks which remove one region of the picture but leave intact other regions of the same picture. For that purpose the control signals S can be generated purely electronically, as is normally performed in the case of regular masks such as rectangles, circles, etc., or by processing of video signals which result from camera pick-up of natural scenes, for example by the so-called blue wall method. Finally, video signals can also be brought in to serve as control signals Reference is now made to FIG. 4 as well as FIG. 3 for further explanation of the system of FIG. 3. FIG. 4 is an enlarged representation of the priority cascade 8 or 9, with reference numerals in parentheses corresponding to the cascade 9 being given next to normal reference numerals corresponding to the cascade 8.

For the present explanation it is assumed that the crosspoints of the crossbar switch 6 which are respectively emphasized by circles are switched through (conducting) while none of the other switchable crosspoints of the crossbar switch 10 is conducting. The switchable crosspoints are designated by diagonal lines in the drawings. It is also assumed that $n=1$, so that the priority signals P2i supplied over the crossbar switch 7 are ineffective ($n=0$). Delay circuits 51 to 55 are provided (shown only in FIG. 4 for pictorial clarity) to equalize the propagation time of signals in the subtracters 31 to 35 and in the multipliers 41 to 45.

The control signal S11 determines the contribution to the aggregate amplitude which the input signal of highest priority can be permitted to claim—in the case of the above-outlined setting of the crossbar switches 6 and 10, that highest priority signal is the video signal E12. If $S11=0$, the signal in question is not transmitted further. If $S11=1$ (100%), the signal in question is incorporated at full amplitude into the output signal, in which case no possibility of contribution is left over for the input video signals of lower priority. The picture components represented by these lower priority video signals is consequently "concealed" by the picture components of the input video signal E12.

For a value of S11 between 0 and 1 a residual amplitude range is left over for the input video signals of lower priority, so that the affected portions of the input video signal E12 will appear transparent.

The left-over amplitude range for the lower priority video signals is calculated by subtraction of a higher priority signal P11 to P15 from the available amplitude range. This is done by the subtracters 31 to 35. The contribution of the next video signal in sequence is calculated by the multiplier 41 to 45 which each have an input connected to the output of a corresponding subtracter 31 to 35, and is delivered as priority signal P12 to P16 as the case may be. In the case of the signals P12 to P15, that priority signal is also supplied to the next subtracter to begin calculation of the priority signal for the next lower priority.

FIG. 6a shows a scene with a legend written across it. To compose such a picture output an input video signal representing a landscape background may be supplied, for example to the input E1, while the input video signal E2 contains the picture of a speaking woman in front of a blue wall and a line of large letters is supplied as the input video signal E12. If now the control signal S11 is formed so that it represents a mask for the lettering, maintaining the value 0 outside of the letters and the value 1 within the letters, the lettering receives the highest priority. The letters are therefore seen by the viewer as presented in front of the rest of the picture. A control signal S12 is derived, by means of a so-called blanking signal shaper, from the input video signal E2, taking on the value 0 during the scanning of the blue wall and the value 1 during the scanning of the speaker picture. Thus, outside of the letters, P12 will have the value 1 when the picture of the speaker is scanned. P13, which controls the background, will be 0 during that time, so that the speaker will appear in front of the background.

In the mixer system of FIG. 3 it is possible to compose a picture by means of the priority cascade 8 and the crossbar switches 6 and 10 and also another picture with the assistance of the priority cascade 9 and the crossbar switches 7 and 11. It is possible then to fade over from one to the other by means of the addition circuits 3 and the multipliers 4 and 5. This can be carried out gradually, suddenly or by moving pattern (special effect) with corresponding variation of the value n. In so doing n(t) can be the same for all fading stages, or different (for example, a combination of different special effect fadings in which each individual fade or effect is related to the participating video signals). In such a case the priority cascades can be used in alternation, one of them being set up for the next output picture of the mixer while the other generates the priority signals for the currently displayed picture.

A further crossbar switch 60 is provided to enable previewing of the next output picture. With the switch 60 the priority signals of the next picture (to be displayed after the next fade) control the input video signals in the way above described by means of the multipliers 61 to 66. The preview picture is then put together by the addition circuit 67 and can then be taken from the output terminal for display on a monitor (not shown).

Although 12 inputs are provided in the mixer system of FIG. 3, it is expected that not more than six input video signals will participate in the composition of any one picture. The double count of video inputs make possible the fading over from one picture composed of six input video signals to another composed of six other input video signals. Input video signals that participate in two successive output pictures can then be kept connected to the same multipliers, so that the disturbances mentioned at the beginning of this specification will not occur.

In the generation of a preview picture, of course, a new set-up can be provided from preview picture to preview picture by the crossbar switch 60 In the illustrated case six multipliers 61 to 66 are sufficient for a preview. In the course of composition of an output video signal that will be faded in later, the inputs Ev1 to Ev6 of the preview mixer unit 61, 62... 68 are automatically occupied by input video signals in such a way that the allocation of these video signals to the priority signals is identical to those provided for the next output signal to be faded in as prepared for availability by one of the crossbar switches 6 or 7 and the participating inputs Ei and multipliers Mi. The preview mixing unit 61-68 can be selectively supplied with priority signals P1i or P2i by means of the crossbar switch 60.

So long as within a picture composition a video input signal remains allocated to a single priority plane, a simple connection of the crossbar switch 10 with the crossbar switch 6 is sufficient without an addition circuit 12. If, however, a change of priority plane within a picture signal of a picture composition takes place, the corresponding priority signals must be added in an addition circuit 12 or 13 and the result supplied to the crossbar switch 6 or 7. This will now be explained with respect to pictures b) and c) of FIG. 6. It should be mentioned preliminarily, however, that within the scope of the invention it is also possible to provide more than two priority planes for any one input video signal. For that purpose the addition circuits 12 and 13 would be provided with a corresponding number of inputs and the crossbar switches would be provided with the necessary number of output lines and crosspoints.

Figure 6:
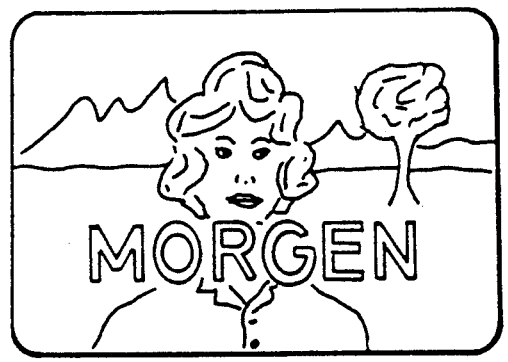
FIG. 6 is a representation of three examples, a), b), and c), of pictures that can be displayed by the output of the video mixer of FIG. 3.
Figure 6:
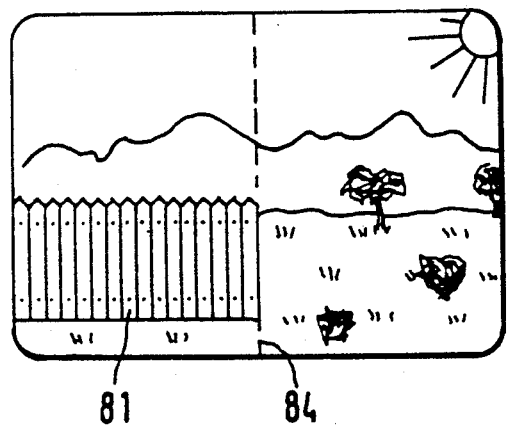
Figure 6:
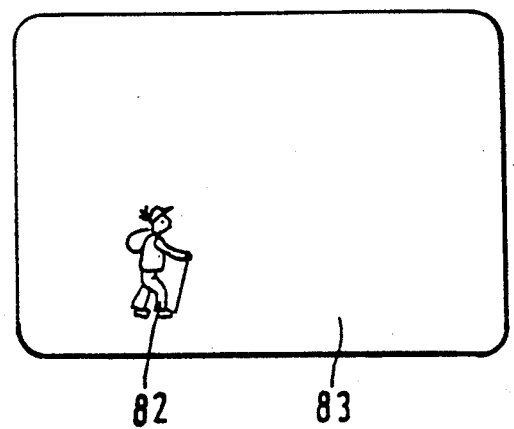

The picture b) of FIG. 6 shows a first input picture supplied to a mixer and the picture c) of FIG. 6 shows a second input picture. That first picture is a landscape with an opaque fence 81 in the foreground. A picture is made of a hiker or vagrant walking in front of a blue wall and that picture is the picture c) of FIG. 6 referred to above as the second picture. In the output picture the vagrant is first to be hidden by the fence 81, being in the position illustrated in FIG. 6, but after a few steps behind the fence he is to appear. For that purpose the crosspoints of the crossbar switches 7 and 11 which are designated by squares in FIG. 3 are made conducting. The input video signal that produces the picture b) of FIG. 6 is supplied to the input E3, while the input video signal for the picture c) of FIG. 6 is connected to the input E11. A control signal S21 has, line by line, the value 1 out to the broken line 84 of the picture b) of FIG. 6 and then the value 0. Another control signal S23 behaves in a complementary way; it is 0 out to the broken line 84 and then jumps to 1. A switching signal S22 is derived rom the input video signal E11 (picture c) of FIG. 6) which is 1 for those pixels which represent the hiker but has the value 0 for all other pixels.

By the effect of the control signals S21, S22 and S23 the output picture is composed as follows: to the left of the broken line 84 the picture b) of FIG. 6 has priority or precedence over the picture c). This is independent of the control signal S22 derived from the picture c), since the subtraction of the control signal S21 from the value 1 supplied at 30 leaves 0, so that all signals except E3 are not passed on at all. To the right of the broken line 84 the control signal 22 can be effective. Since it is 0 for pixels outside of the representation of the hiker, multiplication by 1 there also produces 0 for the priority signal P22, so that the signal E11 (the blue wall) has no contribution at all to the output picture.

At the output of the subtractor 32 there is presented again the value 1, which is multiplied by S23, which is also 1. In consequence P23=1 so that the input video signal E3 contributes at full amplitude to the output picture. Since the calculation within the priority cascade 9 takes place with exact numerical values and are therefore reproducible, there is no discontinuity at the broken line 84 in the output picture when P21=1 is replaced by P23=1. The control signal S22=1 is only for pixels which represent the hiker. In that case P22 is likewise 1, so that the input video signal E11 contributes to the output video signal at full amplitude, while P21 and P23 are 0 and thereby suppress the input video signal E3. To the right of the broken line the hiker 82 appears, in front of the background of course. If the broken line 84 is correctly located at the right hand edge of the fence, the effect is produced that the hiker has been walking behind the fence.

FIG. 5 shows, in somewhat more detailed representation, one of the multipliers M1 as well as the related circuits, mainly an addition circuit 3 and two additional multipliers 4 and 5. The priority signals P1i and P2i are respectively supplied from the crossbar switches 6 and 7 to the multipliers 4 and 5. For the case in which the video signals to be mixed are present as analog signals, a digital-to-analog converter 71 must be provided between the addition circuit 3 and the analog multiplier Mi. The fading over signal n which can assume values between 0 and 1 is supplied to an input 72. It controls the multiplier 4 directly and the multiplier through a circuit 73 which produces from n its unity complement $\bar{n}$. In the special case in which P1i=P2i, the relation P1i=P2i holds during the entire fading operation.

Although the invention has been described with reference to a particular illustrative example, it will be recognized that variations and modifications are possible within the inventive concept.

I claim:

1. A video mixer system having at least three video signal inputs respectively connected to a multiplicity of primary multipliers for multiplying video signals respectively present at least three of said signal inputs, wherein:

said multipliers have outputs respectively connected to inputs of a single addition circuit to which the outputs of all said primary multipliers are connected without any preliminary stage for adding together two or more but less than all outputs of said multipliers being interposed in a connection between an output of a said multiplier and said single addition circuit, said single addition circuit for said multiplied video signals having a sum output for making available an output video signal;

each said video signal input (E1, E2, ... Ej) is connected to only one of said primary multipliers (M1, M2, ... Mj);

means are provided for supplying mixing factor control signals (BL) to said primary multipliers (M1, M2, ... Mj) for determining the relative contributions, if any, of said respective video signals to said output video signal, and means are provided to assure that the sum of said mixing factor control signals relating to said inputs at which respective video signals simultaneously contributing to said output video signal are present corresponds to a predetermined value representative of the amplitude range of said output video signal.

2. A video mixer system having a multiplicity of video signal inputs respectively connected to a multiplicity of primary multipliers for multiplying video signals present at at least some of said signal inputs, said multipliers having outputs respectively connected to inputs of an addition circuit, said addition circuit having a sum output for making available an output video signal, wherein:

each said video signal input (E1, E2 ... Ej) is connected to only one of said primary multipliers (M1, M2 ... Mj);

means are provided for supplying mixing factor control signals (BL) to said primary multipliers for determining the relative contributions, if any, of said respective video signals to said output video signal, said mixing factor control signals (BL) being digital signals the numerical values of which are changeable from pixel to pixel and the numerical sum of which is a predetermined constant value, said digital signals being supplied directly to said respective primary multipliers in the event that said video signals are digital signals and being supplied thereto through a digital to analog converter int eh event that said video signals and multipliers are, respectively, analog signals and devices, and means are provided to assure that the sum of said mixing factor control signals relating to said inputs, at which respective video signals simultaneously contributing to said output video signal are present, correspond to a predetermined value representative of the amplitude rang of said output video signal.

3. A video mixer system having a multiplicity of video signal inputs respectively connected to a multiplicity of primary multipliers for multiplying video signals respectively present at at least some of said signal inputs, said multipliers having outputs respectively connected to inputs of an addition circuit, said addition circuit having a sum output for making available an output video signal, wherein:

means are provided for supplying mixing factor control signals (BL) to said primary multipliers for determining the relative contributions, if any, of said respective video signals to said output video signal, said means for supplying mixing factor control signals including means for deriving said mixing factor control signals from at least one set of priority signals (P1i, P2i) arranged in a priority sequence and means for deriving said at least one set of priority signals from respective control signals(S), each of which designates an amplitude range prescribed for a corresponding input video signal which is to be available to a corresponding video signal input (E) in the event that no control signal (S) of higher priority has a non-zero value, and means are provided to assure that the sum of said mixing factor control signals relating to said inputs, at which said respective video signals simultaneously contributing said output signal are present, corresponds to a predetermined value representative of the amplitude range of said output video signal.

4. The video mixer system of claim 3, wherein means are provided for selectably establishing the allocation of priority signals (P1i, P2i) to respective input video signals (E1, E2... E12) for selectably establishing correspondence between said priority signals and input video signals.

5. The video mixer system of claim 3, wherein each of said primary multipliers has a control input for a said mixing factor control signal (BL), which input is connected to the output of a fading circuit composed of a fading addition circuit (3) having its sum output connected to said control input of said primary multiplier and having first and second inputs, a first fading multiplier (4) having its output connected to said first input of said fading addition circuit (3), a first input for receiving a first one of two priority signals (P1i, P2i) and a second input connected to a source of a fading control signal (72), means (73) for deriving a unity complement signal having an input connected to said source (72) of said fading control signal (n) and having an output for providing the unity complement (n) of said fading control signal, and a second fading multiplier (5) having its output connected to said second input of said fading control addition circuit, a first input for receiving the second one of said two priority signals (P1i, P2i) and a second input connected to said output of said means for producing a unity complement, whereby video signals respectively supplied from said video signal inputs to said primary multipliers can be simultaneously faded, by variation of said fading control signal (n), from mixing factor control signals derived from a first set of priority signals (P1i) over to mixing factor control signals derived from a second set of priority signals (P2i).

6. The video mixer system of claim 3, comprising at least one cascade circuit (8; 9) for deriving priority signals (P1i; P2i) from said control signals, of which at least one circuit each cascade stage corresponds to one level of priority in a priority sequence below top priority and consists of a subtracter (31-35) having an output, a first input and a subtrahend input, and a multiplier (41-45), the subtracter (31) of a first cascade stage having its first input connected to a source of a signal corresponding to said predetermined value representative of the amplitude range of said output video signal and its subtrahend input connected to a source of a control signal of first priority (S11; S21) and having an output, the output of each of said subtracters (31-35) being connected to a first input of the said respective multiplier (41-45) of the same priority stage and to the subtrahend input of a subtracter (32-35) of the following cascade stage if there is a following stage, the multipliers (41-45) of said cascade stages respectively having second inputs connected to receive said control signals (S12-S16; S22-S26), the outputs of said cascade stage multipliers (41-45) being connected to first inputs of the respective subtracters (32-35) of the following cascade stage if there is a following stage and also being connected to a priority signal output (P22-P16; P22-P26) the top priority signal (P11; P21) being identical with control signal S11; S21).

7. The video mixer system of claim 3, wherein at least one crossbar switch (6, 10; 7, 11) is provided for selectively applying priority signals (P11-P16; P21-P26) for control of said respective primary multipliers (M1-M12).

8. The video mixer system of claim 6, wherein said priority signals derived from said at least one cascade circuit (8; 9) are provided to the control inputs of said primary multipliers through a first crossbar switch (10; 11) a set of addition circuits (12; 13) and a second crossbar switch (6; 7), said first crossbar switch being connected for interconnecting said priority signals (P11-P16; P21-P26) with respective first inputs of addition circuits of said set of addition circuits (12; 13), said priority signals also being connected to respective second inputs of said addition circuits of said set and said second crossbar switch being connected for interchangeably connecting the outputs of said respective addition circuits of said set for delivery to respective circuits (3, 4, 5) for supplying mixing factor control signals to said primary multipliers (M1-M12).

9. The video mixer system of claim 8, wherein a preview mixing unit (61-68) is provided having a multiplicity of video signal inputs respectively connected to a corresponding multiplicity of multipliers respectively having control inputs and further comprising an additional crossbar switch, for interconnecting said multiplier inputs of said preview mixer unit to input crossbars of said second crossbar switch connected to the addition circuit inputs to which priority signals of said at least one cascade circuit are supplied.

10. The video mixer system of claim 2, comprising at least one cascade circuit (8; 9) for deriving priority signals (P1i; P2i) from said control signals(s), of which at least one circuit each cascade stage corresponds to one level of priority in a priority sequence below top priority and consists of a subtracter (31-35) having an output, a first input and a subtrahend input, and a multiplier (41-45), the subtracter (31) of a first cascade stage corresponding to second priority having its first input connected to a source of a signal corresponding to said predetermined value representative of the amplitude range of said output video signal and its subtrahend input connected to a source of a control signal of first priority (S11; S21), the output of each of said subtracters (31-35) being connected to a first input of the said respective multiplier (41-45) of the same priority stage and to the subtrahend input of a subtracter (32-35) of the following cascade stage if there is a following stage, the multipliers (41-45) of said cascade stages respectively having second inputs respectively connected to receive said control signals (S12-S16; S22-S26), the outputs of said cascade stage multipliers (41-45) being connected to first inputs of the respective subtracters (32-35) of the following cascade stage if there is a following stage and also being connected to a priority signal output (P12-P16; P22-P26) the top priority signal (P11; P21) being identical with control signal (S11; S21).

11. The video mixer system of claim 10, wherein each of said primary multipliers has a control input for a said mixing factor control signal (BL), which input is connected to the output of a fading circuit composed of a fading addition circuit (3) having its sum output connected to said control input of said primary multiplier and having first and second inputs, a first fading multiplier (4) having its output connected to said first input of said fading addition circuit (3), a first input for receiving a first one of two priority signals (P1i, P2i) and a second input connected to a source of a fading control signal (72), means (73) for deriving a unity complement signal having an input connected to said source (72) of said fading control signal (n) and having an output for providing the unity complement (n) of said fading control signal, and a second fading multiplier (5) having its input connected to said second input of said fading control addition circuit, a first input for receiving the second one of said two priority signals (P1i, P2i) and a second input connected to said output of said means for producing a unity complement, whereby video signals respectively supplied from said video signal inputs to said primary multiplier can be simultaneously faded, by variation of said fading control signal (n), from mixing factor control signals derived from a first set of priority signals (P1i) over to mixing factor control signals derived from a second set of priority signals (P2i), and wherein there is a first said cascade circuit (8) and a second said cascade circuit (9), said first cascade circuit (8) having means for selectively connecting a first set of priority signals (P11 to P16) to the respective first inputs of said first fading multipliers (4) of said primary multipliers and said second cascade circuit (9) having means for selectively connecting the second set of priority signals (P21 to P26) to said respective first inputs of said second fading multipliers (5), whereby variation of said fading control signal (n) provides fading as aforesaid.

12. A video mixer system having a multiplicity of video signal inputs respectively connected to a multiplicity of primary multipliers for multiplying video signals respectively present at at least some of said signal inputs, wherein:
  each said video signal input (E1, E2, . . . Ej) is connected to only one of said primary multipliers (M1, M2, . . . Mj);
  means are provided for supplying mixing factor control signals (BL) to said primary multipliers (M1, M2, . . . Mj) for determining the relative contributions, if any, of said video signals to said output video signal;
  said means for supplying mixing factor control signals include means comprising switching means (10, 11) and addition means (12, 13), for transferring the generation of a mixing factor control signal for a selected one of said primary multipliers from the influence of a priority factor related to one priority plane to the influence of a priority factor related to another priority plane in accordance with a preprogrammed change between tow priority planes assigned to the input video signal supplied to said selected primary multiplier, and
  means are provided to assure that the sum of said mixing factor control signals relating to said inputs at which respective video signals simultaneously contributing to said output video signal are present corresponds to a predetermined value representative of the amplitude range of said output video signal.

* * * * *